(12) United States Patent
Nakamura

(10) Patent No.: US 11,040,699 B2
(45) Date of Patent: Jun. 22, 2021

(54) SECURITY SYSTEM

(71) Applicant: Kazuto Nakamura, Osaka (JP)

(72) Inventor: Kazuto Nakamura, Osaka (JP)

(73) Assignee: Kazuto Nakamura, Osaka (JP)

( * ) Notice: Subject to any disclaimer, the term of this patent is extended or adjusted under 35 U.S.C. 154(b) by 0 days.

(21) Appl. No.: 16/547,041

(22) Filed: Aug. 21, 2019

(65) Prior Publication Data
US 2019/0375375 A1 Dec. 12, 2019

Related U.S. Application Data

(63) Continuation-in-part of application No. 16/149,742, filed on Oct. 2, 2018, now abandoned.

(30) Foreign Application Priority Data

Jun. 5, 2018 (JP) .............................. JP2018-107739

(51) Int. Cl.
B60R 25/30 (2013.01)
H04W 4/80 (2018.01)
H04M 1/725 (2021.01)
B60R 25/31 (2013.01)
(Continued)

(52) U.S. Cl.
CPC .......... B60R 25/302 (2013.01); B60R 25/305 (2013.01); B60R 25/31 (2013.01); B60R 25/33 (2013.01); H04M 1/72412 (2021.01); H04W 4/80 (2018.02); B60R 2325/103 (2013.01); B60R 2325/205 (2013.01); H04M 2207/12 (2013.01)

(58) Field of Classification Search
CPC .......... G06F 21/32; G06F 21/00; G06F 21/31; G06F 3/167; G06F 2212/1052; H04W 12/06; H04W 4/046; H04W 12/08; H04W 48/02; B60R 16/0373; B60R 25/257; G07C 5/0866; H04N 21/4334; H04N 21/4435
See application file for complete search history.

(56) References Cited

U.S. PATENT DOCUMENTS 9,014,345 B2 4/2015 Barnes
10,594,991 B1 * 3/2020 Skolnick ................ H04N 7/188
(Continued)

FOREIGN PATENT DOCUMENTS

JP 6233787 B 11/2017

*Primary Examiner* — Liton Miah
(74) *Attorney, Agent, or Firm* — Leason Ellis LLP

(57) ABSTRACT

A security system for acquiring situation data at the time of trouble in a space where a customer receives a service. The security system includes a recorder for capturing an image and recording a sound for security in a space in which a customer receives a service provided by a service provider, and a server used for providing the service and managed by the service provider. The server includes a processor which executes a software for running the system, and an application storage for storing a customer application which is downloaded to the mobile terminal possessed by the customer. A processor of the mobile terminal is, by executing the customer application, starts the recorder, takes the recorded data into the mobile terminal, and transmits the data to the server for recording the data in the server. The customer can use the captured and recorded data as objective situation data.

7 Claims, 10 Drawing Sheets

(51) Int. Cl.
*B60R 25/33* (2013.01)
*H04M 1/72412* (2021.01)

(56) References Cited

U.S. PATENT DOCUMENTS

| | | | |
|---|---|---|---|
| 2015/0166009 A1* | 6/2015 | Outwater | B60R 25/04 |
| | | | 701/2 |
| 2016/0189544 A1 | 6/2016 | Ricci | |
| 2017/0200333 A1 | 7/2017 | Plante | |
| 2018/0162301 A1 | 6/2018 | Meng et al. | |
| 2018/0373936 A1* | 12/2018 | Kim | G06K 9/00671 |
| 2019/0019353 A1* | 1/2019 | Brent | H04N 13/189 |
| 2020/0349666 A1* | 11/2020 | Hodge | G06F 21/36 |

* cited by examiner

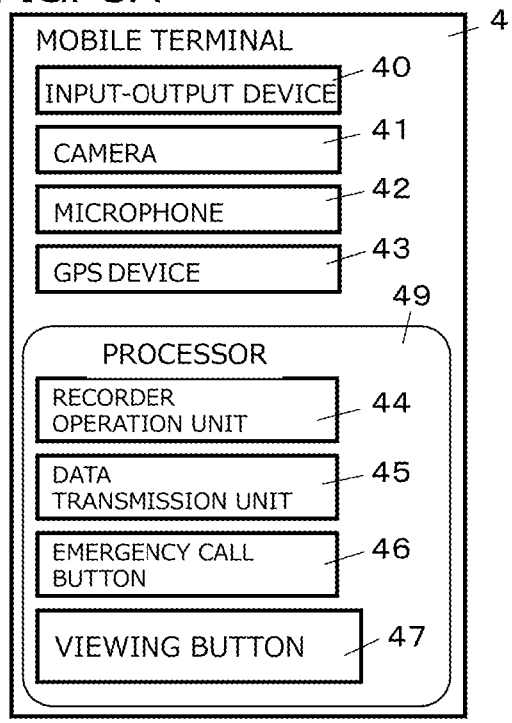
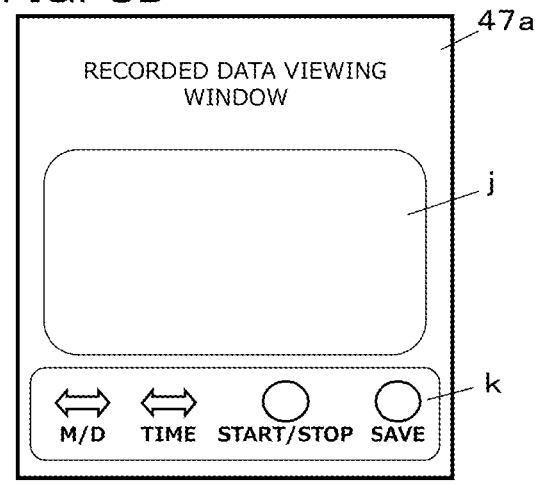
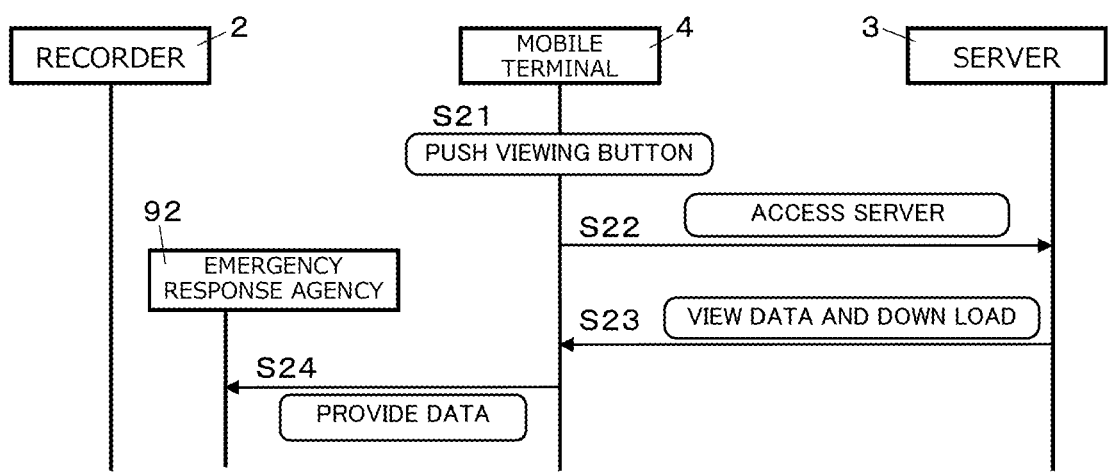

FIG. 13A

| PASSENGER BOOKING LIST 33a | | |
|---|---|---|
| (1) | TIME ○○H○○M ~ ○○H○○M<br>DEPT ……… DEST ………<br>FARE ○○○○ YEN | |
| (2) | TIME ○○H○○M ~ ○○H○○M<br>DEPT ……… DEST ………<br>FARE ○○○○ YEN | |
| (3) | TIME ○○H○○M ~ ○○H○○M<br>DEPT ……… DEST ………<br>FARE ○○○○ YEN | |
| (4) | TIME ○○H○○M ~ ○○H○○M<br>DEPT ……… DEST ………<br>FARE ○○○○ YEN | |
| (5) | TIME ○○H○○M ~ ○○H○○M<br>DEPT ……… DEST ………<br>FARE ○○○○ YEN | |
| (6) | TIME ○○H○○M ~ ○○H○○M<br>DEPT ……… DEST ………<br>FARE ○○○○ YEN | |
| (7) | TIME ○○H○○M ~ ○○H○○M<br>DEPT ……… DEST ………<br>FARE ○○○○ YEN | |
| (8) | TIME ○○H○○M ~ ○○H○○M<br>DEPT ……… DEST ………<br>FARE ○○○○ YEN | |
| TO NEXT PAGE | | |

FIG. 13B

INTENSION-OF-PICKING-UP REPLY WINDOW (3) TIME ○○H○○M ~ ○○H○○M
DEPT ……… DEST ………
FARE ○○○○ YEN

PICKING-UP TIME (ESTIMATION)

☐ Hr  ☐ Min   ARRIVAL TIME (SCHEDULE)

REPLY BUTTON TO PICK-UP CUSTOMER

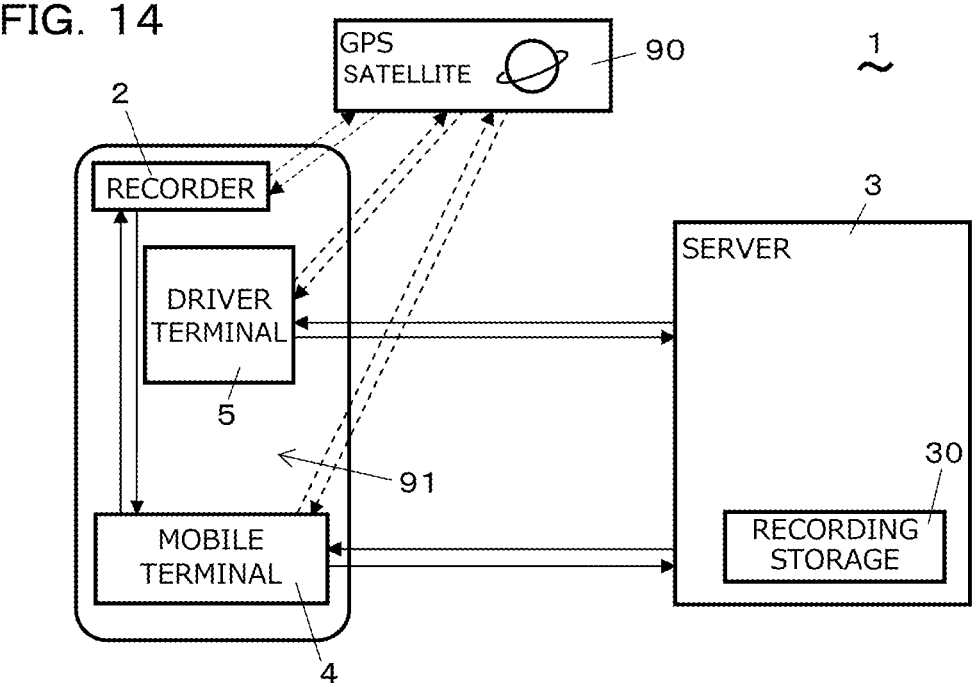

FIG. 14

SECURITY SYSTEM

This application is a continuation-in-part of U.S. patent application Ser. No. 16/149,742 filed Oct. 2, 2018, which claims for priority of Japanese Patent Application No. 2018-107739, filed Jun. 5, 2018, which is incorporated herein by reference in its entirety.

BACKGROUND OF THE INVENTION

The present invention relates to a security system for suppressing troubles occurring in a closed-room-like space in which a service is provided and for handling after occurrence of the trouble, and the like.

Conventionally, an emergency notification system is known, which records information for the purpose of an emergency call at the time of occurrence of a trouble such as an accident and for the purpose of preventing occurrence of troubles, wherein the emergency notification system is configured by connecting a terminal device such as a mobile phone possessed by a user and a server device with network (see, for example, Japanese Patent No. 6233787).

The terminal device of the above emergency notification system includes: an receiving means for receiving an operation done by a user; a position information acquiring means for acquiring position information of the terminal device; and a sending means for sending at least the position information to a server according to an input operation received by the receiving means. The sending means sends anxiety detection information indicating that the user feels uneasy when the receiving means receives predetermined input operation, and sends emergency notification information indicating that the user is in an emergency situation to the server, when the receiving means does not receive cancel input operation after receiving the predetermined input operation. The emergency notification information includes surrounding videos and sounds acquired by the terminal device operated by the user in order to prevent occurrence of incidents and accidents in advance.

SUMMARY OF THE INVENTION

However, in the emergency notification system as shown in Japanese Patent No. 6233787, although the situation can be recorded and confirmed by the anxiety detection information and the emergency notification information, it is deemed that only information advantageous for the user possessing the mobile terminal device at the time of trouble can be acquired, and it is difficult to acquire the situation information data at the time of trouble from an objective point of view. In particular, in the case of customers who receive services in a closed-room like space such as a conference room, a counseling room, a taxi cabin, etc., there is a limit to the amount of information acquired and recorded for trouble prevention and response by only the mobile terminal device possessed by the customer, and moreover it becomes unilateral information of the customer side.

The present invention is to solve the above-mentioned problems, and an object of the present invention is to provide a security system which is capable to acquire situation data for both sides, from an objective point of view, at the time of trouble in a space where a customer receives a service.

In order to achieve the above object, the security system of the present invention, comprises:

a recorder for capturing an image and recording a sound for security in a space in which a customer receives a service provided by a service provider; and a server used for providing the service and managed by the service provider, wherein the server includes a processor which executes an operating software for running the system, and an application storage for storing a customer application which is downloaded to a mobile terminal possessed by the customer by accessing the server from the mobile terminal and is used by the customer to receive the service, wherein the customer application works in association with the operating software, and the mobile terminal includes a processor which executes the customer application, wherein the processor of the mobile terminal is operative to start the recorder executing the capturing and recording, to take the data recorded by the recorder into the mobile terminal, and to transmit the data taken from the recorder to the server for recording the data in the server.

In another embodiment of this security system, the processor of the mobile terminal is operative to display the image captured by the recorder sequentially in a display area of the mobile terminal when the recorder is in operation and executing the capturing and the recording.

In another embodiment of this security system, the mobile terminal includes a data acquisition device for acquiring a sound or an image around the mobile terminal and data of the position information of the mobile terminal, and the processor of the mobile terminal is operative to transmit the data taken by the data acquisition device to the server.

In another embodiment of this security system, the recorder includes a GPS device for acquiring own position information, and the processor of the mobile terminal is further operative to take data of the position information of the recorder acquired by the GPS device into the mobile terminal.

In another embodiment of this security system, the processor of the mobile terminal is operative so that the customer can call an emergency response agency.

In another embodiment of this security system, the processor of the mobile terminal is operative so that the customer can view the data in the server using the mobile terminal, wherein the data was transmitted to the server and recorded in the server by the mobile terminal.

In another embodiment of this security system, the recorder is mounted on a car driven by a driving worker of taxi, the application storage further stores a driver application which is downloaded to a driver terminal possessed by the driving worker by accessing the server from the driver terminal and is used by the driving worker to provide a taxi dispatch service to the customer, wherein the driver application works in association with the operating software, and the driver terminal includes a processor which executes the driver application, wherein the processor of the mobile terminal is operative to send a dispatch request and data of the position information of the mobile terminal from the mobile terminal to the server, the processor of the server is operative to receive the dispatch request and the data of the position information of the mobile terminal sent from the mobile terminal, and to create a passenger booking list, the processor of the driver terminal is operative so that the driving worker, using the driver terminal,
can view the passenger booking list, and
can notify a reply of an intention of picking-up to the server as a wish of the driving worker, and
the processor of the server is operative
to receive the intention of picking-up sent from the driver terminal,
to determine whether or not the car is suitable for picking-up based on the position information of the driver terminal and the position information of the mobile terminal, and to notify a decision of picking-up car to the driver terminal suitable for picking-up.

According to the security system of the present invention, the customer can operate the recorder for capturing an image of the inside of the space in which a service is provided, transmit the data captured and recorded by the recorder to the server, and record the data in the server, by using the mobile terminal and the customer application, and therefore, it is possible to acquire objective data indicating the situation in the space at the time of occurrence of a trouble between the customer and the service provider, and such an objective data can be used for properly responding to the trouble.

BRIEF DESCRIPTION OF THE DRAWINGS

FIG. 8A is a configuration diagram of the mobile terminal in a case where the customer application in the security system has a function of viewing recorded data, and FIG. 8B is a view showing a recorded data viewing window on the mobile terminal.

FIG. 9 is a sequence diagram illustrating an operation of a recorded data viewing in the security system.

FIG. 13A is a diagram showing a passenger booking list created by a server in the security system of FIG. 10, and FIG. 13B is a view showing an intention-of-picking-up reply window displayed on the driver terminal.

FIG. 14 is a configuration diagram of the security system of FIG. 10 showing a state in which a customer possessing a mobile terminal in the security system gets on a taxi equipped with a recorder.

DETAILED DESCRIPTION OF THE INVENTION

First Embodiment

Figure 1:
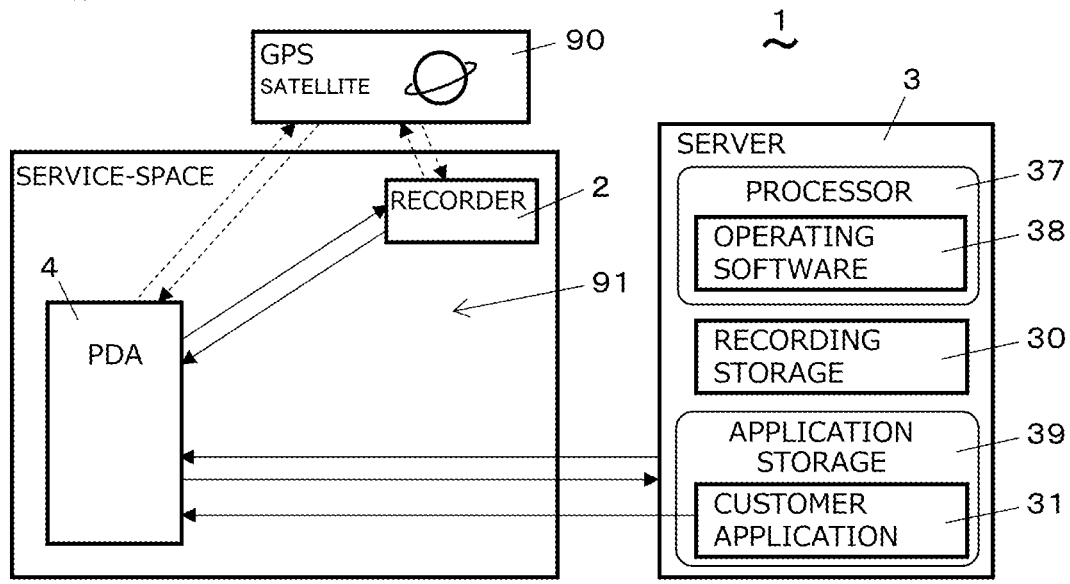
FIG. 1 is a configuration diagram of a security system according to the first embodiment of the present invention.
Figure 2A:
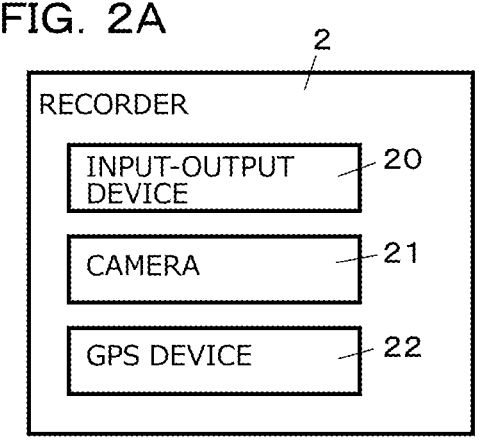
FIG. 2A is a configuration diagram of a recorder in the security system.
Figure 2B:
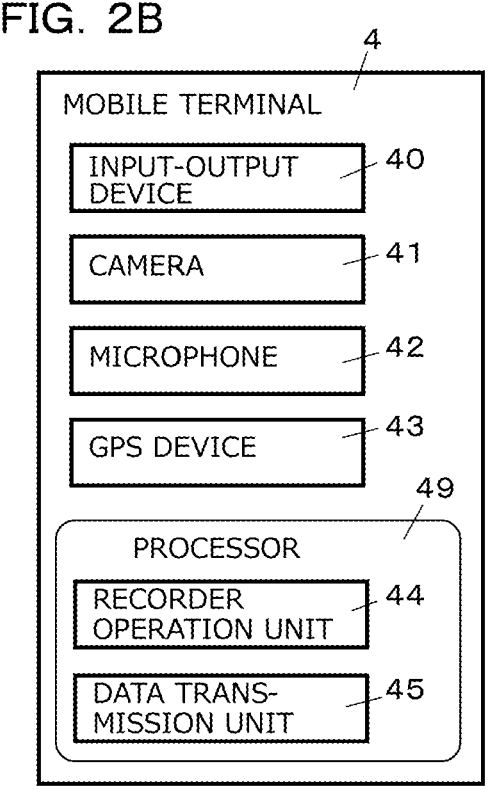
FIG. 2B is a configuration diagram of a mobile terminal used in the security system.

A security system 1 according to the first embodiment of the present invention is described with reference to FIG. 1 to FIG. 9. As shown in FIG. 1, FIG. 2A and FIG. 2B, the security system 1 includes a recorder 2 for capturing an image and recording a sound for security in a space 91 in which a customer receives a service provided by a service provider, and a server 3 managed by the service provider and used for providing the service to the customer possessing a mobile terminal 4. The recorder 2 and the mobile terminal 4, and also the server 3 and the mobile terminal 4 are connected to each other via a network, respectively. The network connection may or may not include the Internet in its communication path.

The concept of the space 91 includes all kinds of closed-room-like spaces, and includes a conference room, a counseling room, a waiting room, other stationary spaces, and a moving space, for example, a cabin interior space of a taxi. The closed-room-like space is not limited to a merely closed space, and it may be a space, for example, in a situation where it is difficult for witnesses to see and hear internal situations, therefore such an open space in remote areas is also included in the closed-room-like space. The security system 1 is used, for example, to defend a customer when the customer using the space 91 are involved in trouble and to prevent such troubles from occurring in advance.

The recorder 2 includes an input-output device 20 for performing bidirectional communication with the mobile terminal 4, a camera 21 for capturing moving images while acquiring sound data such as voice et al., and a GPS device 22 for obtaining self-position information based on information issued by GPS (global positioning systems) satellites 90 or the like. The input-output device 20 has a function of performing bidirectional wireless communication with the mobile terminal 4, and performs data communication by, for example, Wi-Fi or Bluetooth (registered trademark). The GPS device 22 may not be provided when the space 91 is a stationary space. The recorder 2 is under the control of a person who manages the space 91 or the service provider. The recorder 2 may be capable of communicating from the server 3 via the input-output device 20, and thus, for example, the recorder 2 may be capable of being operated remotely by communication from the server 3 for confirming the operation, troubleshooting, further adjusting the angle of view or the field of view, etc. Further, bidirectional communication may be possible between the recorder 2 and the server 3 for transmission of captured and recorded data, or transmission of a control program, and the like.

The server 3 includes a processor 37 which executes an operating software 38 for running the system, a recording storage 30 for storing data transmitted from the mobile terminal 4 and an application storage 39 for storing a customer application 31 which is an application program used for providing a service. The customer application 31 is downloaded to the mobile terminal 4 by accessing the server 3 from the mobile terminal 4 possessed by the customer and is used by the customer to receive the service, wherein the customer application 31 is installed in the mobile terminal 4 and then works in association with the operating software 38. The server 3 is under the control of the person who manages the space 91 or the service provider. The server 3 manages the operation of the security system by the application program or the like provided to the customer and the operating software 38.

The mobile terminal 4 is a terminal having functions of general portable computer such as a memory for storing data such as an image and a software program, a display or a window for a graphical user interface (GUI), a CPU, and the like.

The mobile terminal 4 includes a processor 49 which executes the customer application 31. The processor 49 is configured with functions included by a general mobile computer terminal. The mobile terminal 4 is a terminal including an input-output device 40, and a data acquisition device for acquiring a sound or an image around the mobile terminal 4 and data of the position information of the mobile terminal 4. The mobile terminal 4 may use, as the data acquisition device, for example, a camera 41, a microphone 42, a GPS device 43, and the like. The mobile terminal 4 may be, for example, a mobile phone, a smart phone, a tablet terminal, a PC (personal computer), or the like.

The mobile terminal 4 further includes a recorder operation unit 44 and a data transmission unit 45 which are generated by installing the customer application 31 downloaded from the server 3. That is, the recorder operation unit 44 and the data transmission unit 45 are functions operated by a program included in the customer application 31 and executed by the processor 49. The programs of the customer application and the functions generated by the customer application 31 in the mobile terminal 4 are collectively referred to by the name of the customer application 31. When the customer application 31 is installed in the mobile terminal 4, for example, an icon or a menu for operating the recorder operation unit 44 is displayed on the window (GUI) of the mobile terminal 4 so that this application can be used.

The input-output device 40 performs bidirectional communication with each of the recorder 2 and the server 3, further, accepts signals, which are input by the customer to operate the mobile terminal 4, and displays responses or outputs sounds to the customer. The input-output device 40 performs input and output of signals between the mobile terminal 4 and devices other than the mobile terminal 4. The input and output between the customer and the mobile terminal 4 are performed through a function of the input-output device 40, for example, a GUI display having a touch panel function. The response with the customer may be performed using the microphone 42 and the earphone, which are the sound input-output functions of the mobile terminal 4. The camera 41 acquires a still image or a moving image of the surroundings of the mobile terminal 4, the microphone 42 acquires data of the surrounding sound of the mobile terminal 4, and the GPS device 43 obtains self-position information of the mobile terminal 4 based on information issued by the GPS satellites 90 or the like.

The processor 49 of the mobile terminal 4 is operative to start the recorder 2 executing the capturing an image and recording a sound, to take the data recorded by the recorder 2 into the mobile terminal 4, and to transmit the data taken from the recorder 2 to the server 3 for recording the data in the server 3. Those operations are more precisely executed by the recorder operation unit 44 and the data transmission unit 45 which are operated by the processor 49. Namely, the recorder operation unit 44 makes the mobile terminal 4 access the recorder 2, starts the capturing and recording by the recorder 2, and takes the data recorded by the recorder 2 into the mobile terminal 4. The data transmission unit 45 makes the mobile terminal 4 access the server 3, transmits the data taken from the recorder 2 by the mobile terminal 4, and records the data in the server 3.

Data recorded in the server 3 is identified and protected for each mobile terminal 4. The identification of the data may be performed using a unique identification code assigned to each customer application 31 downloaded to the mobile terminal 4 or may be performed using an identification code peculiar to the mobile terminal, for example, a telephone number. An identification code combined with a password or the like designated by the customer for these identification codes may be used. Such an identification code is referred to when the customer browses the recorded data in the server 3 by using the mobile terminal 4 and the customer application 31.

Figure 3:
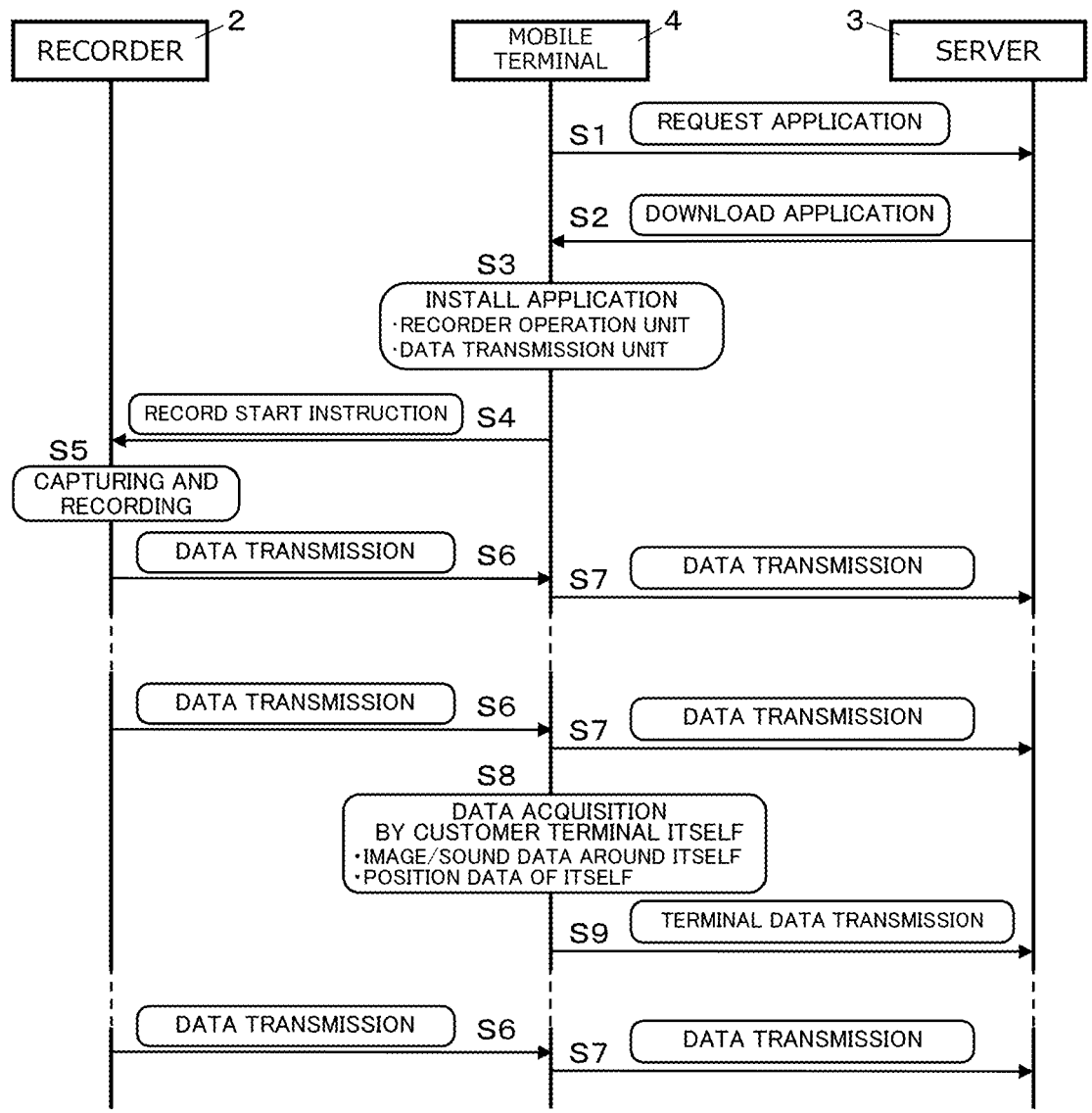
FIG. 3 is a sequence diagram illustrating the operation of the security system.

Next, the operation of the security system 1 is described with reference to FIG. 3. A customer who wishes to receive a service requests the server 3 to provide the customer application 31 via download using the mobile terminal 4 (51). When there is a request to download the customer application 31 from the mobile terminal 4, the processor 37 of the server 3 transmits the customer application 31 to the mobile terminal 4. The processor 47 of the mobile terminal 4 executes the download (S2). When the customer application 31 is installed in the mobile terminal 4, the recorder operation unit 44 and the data transmission unit 45 are generated in the mobile terminal 4 (S3). By performing this installation, icons for operating the recorder operation unit 44 and the data transmission unit 45, for example, are displayed on the display of the mobile terminal 4. The series of processing (S1, S2, S3) up to the installing of the customer application 31 by the customer may be performed only once, before the customer first receives the service by the security system 1.

Figure 4:
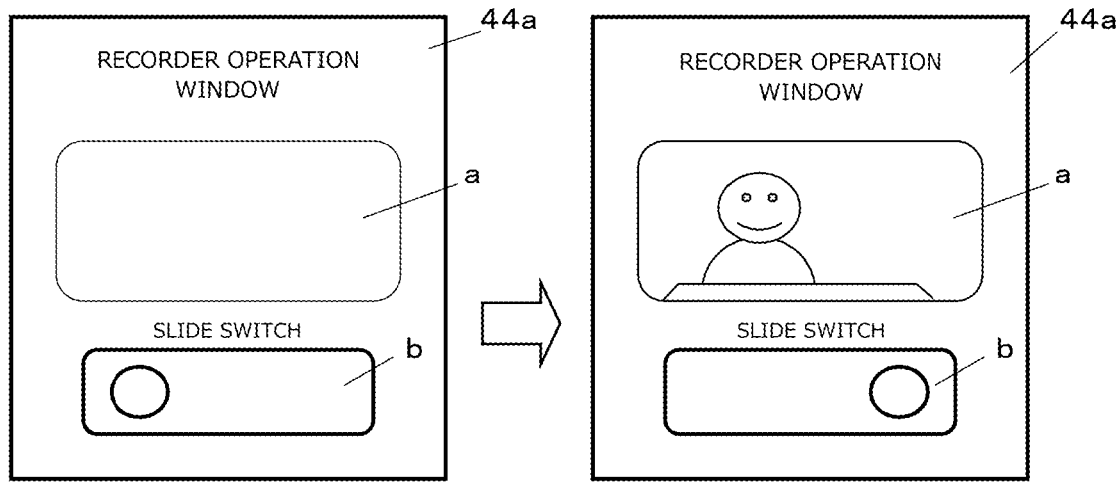
FIG. 4 is a diagram showing a transition example of a recorder operation window on the mobile terminal in the security system.

When the customer executes the program of the recorder operation unit 44 by tapping the icon displayed on the input-output window of the mobile terminal 4, a recorder operation window 44a as shown in FIG. 4 is displayed on the window of the mobile terminal 4. The recorder operation window 44a has a display area a for displaying the image captured and recorded by the recorder 2 and a slide switch b for instructing the recorder 2 to start and stop the operation.

If the recorder 2 is not in operation at the time of start of execution of the recorder operation unit 44, it is possible to transmit a signal for instructing the recorder 2 to start operation by setting the slide switch b to the ON state by stroking the window, in which the switch is displayed, with a finger (S4). This operation is an operation that the recorder operation unit 44 of the customer application 31 makes the mobile terminal 4 access the recorder 2 and makes the recorder 2 start the capturing and recording. As a result, the recorder 2 starts capturing and recording (S5), and the recorder 2 transmits the recorded data to the mobile terminal 4 (S6). By executing the recorder operation unit 44, the data captured and recorded by the recorder 2 can be taken into the mobile terminal 4, and the taken data is sequentially displayed in the display area a. It is noted that the slide switch b can stop the operation of the capturing and recording by the recorder 2, for example, by sliding the slide switch b in a direction opposite to the direction in which the switch is turned on.

If the recorder 2 is executing the capturing and recording at the time of start of execution of the recorder operation unit 44, the slide switch b automatically becomes turned ON state, and the captured image by the recorder 2 is sequentially taken into the mobile terminal 4 and displayed in the display area a. Therefore, the customer can check whether or not the recorder 2 is in operation by the recorder operation unit 44, and can start and stop the capturing and recording by the recorder 2 by the customer's own will.

When the captured data by the recorder 2 is taken into the mobile terminal 4 by the recorder operation unit 44, the data transmission unit 45 makes the mobile terminal 4 access the server 3, and the data taken from the recorder 2 by the mobile terminal 4 is transmitted to the server 3 and recorded in the recording storage 30 of the server 3. As a result, the data from the recorder 2 taken into the mobile terminal 4 is sequentially transmitted to the server 3 by the data transmission unit 45, whereby the data is recorded and accumulated in the recording storage 30 of the server 3 (S7). The data from the recorder 2 may include, in addition to the moving image with sound data, imaging time, and position information of the recorder 2 obtained by the GPS device 22, for example, data of longitude-latitude information, and the recorder operation unit 44 takes these data into the mobile terminal 4.

(Transmission and Recording of Mobile Terminal Data)

In the security system 1, the customer can arbitrarily acquire the image data, the sound data, and the position information data by using a data acquisition device included in the mobile terminal 4 itself, namely, the camera 41, the microphone 42, the GPS device 43 and the like, separately from the data acquired by the recorder 2 (S8). Such data of the sound or image in the vicinity of the mobile terminal 4 and the position information of the mobile terminal 4 acquired by the mobile terminal 4, namely, the data of the environment in which the mobile terminal 4 is placed are transmitted to the server 3 by the data transmission unit 45 (S9), during the data taking from the recorder 2 and the transmission to the server 3.

Figure 5A:
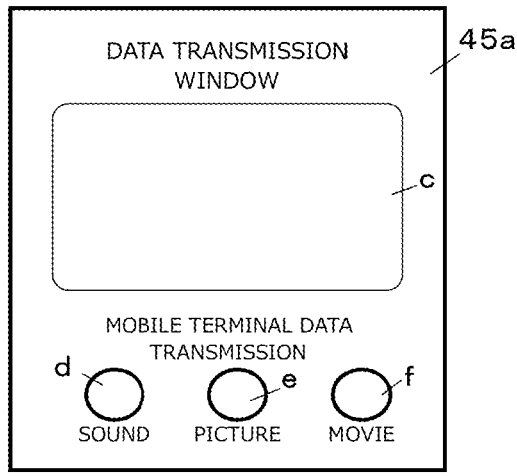
FIG. 5A is a diagram showing a data transmission window on the mobile terminal in the security system.

The data transmission unit 45 may be used to transmit the data acquired by the mobile terminal 4 to the server 3 by the processes of S8 and S9. Such data transmission is performed using a data transmission window 45a in the mobile terminal 4 as shown in FIG. 5A. The data transmission window 45a is provided for the mobile terminal 4 as a function of the data transmission unit 45. The data transmission window 45a has a data display window c used for displaying and confirming data, and further, for example, a sound button d, a photo button e, and a moving image button f so that data is transmitted for each data type. By pressing these buttons, data such as sound or image is acquired by the mobile terminal 4 in advance or in real time, and transmitted to the server 3 for recording, after confirming the data on the data display window c. When transmitting these data acquired by the mobile terminal 4, it is preferable that the data of the position information of the mobile terminal 4 acquired by the GPS device 43 of the mobile terminal 4 is transmitted together with the information of the current time.

Figure 5B:
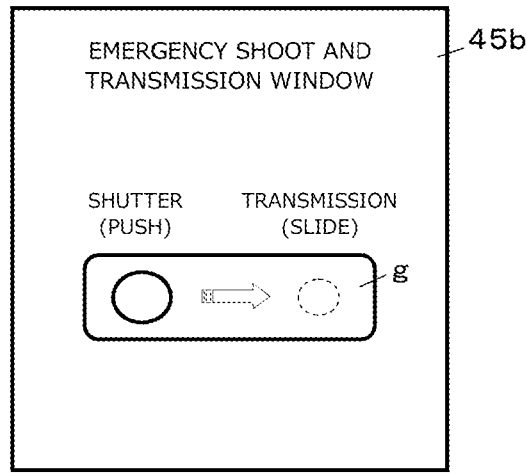
FIG. 5B is a diagram showing an emergency shoot and transmission window on the mobile terminal in the security system.

The mobile terminal 4 may be provided with an emergency shoot and transmission window 45b as shown in FIG. 5B as a function of the data transmission unit 45. The emergency shoot and transmission window 45b has a shoot and transmission button g for quickly taking a picture and transmitting in case of emergency. The shoot and transmission button g includes a push button for driving the shutter of the camera 41 to take a picture and a slide button for transmitting picture data to the server 3, wherein the push button is used as the slide button by tapping and sliding it. The customer can take a picture and transmit it to the server 3 by one-touch-slide operation using the shoot and transmission button g, while the camera 41 of the mobile terminal 4 is directed to the photographing object.

(Emergency Call Button)

Figure 6A:
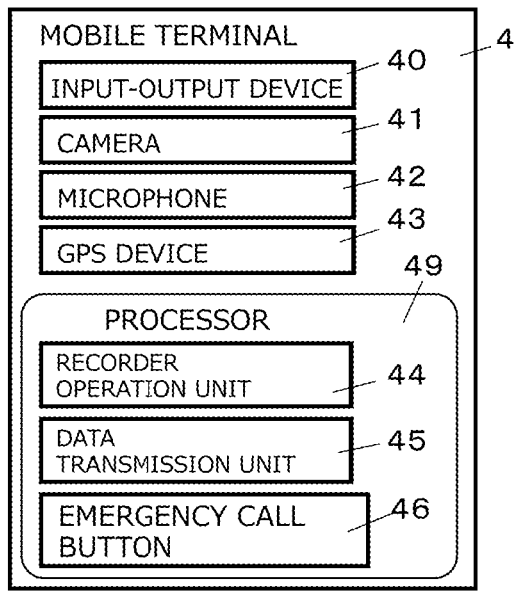
FIG. 6A is a configuration diagram of the mobile terminal in a case where the customer application in the security system has an emergency call function.

Next, an emergency call function is described, which is used for making a telephone call to an emergency response agency at an emergency. The processor 49 of the mobile terminal 4 is operative so that the customer can call an emergency response agency. To make such a call possible in the security system 1, the mobile terminal 4 may have an emergency call function generated by installing the customer application 31 downloaded from the server 3. As the emergency call function, the mobile terminal 4 has an emergency call button 46 as shown in FIG. 6A, for example, which is displayed as an icon on the display of the mobile terminal 4. The emergency call function is executed by the processor 49 by operating a program included in the customer application 31.

Figure 6B:
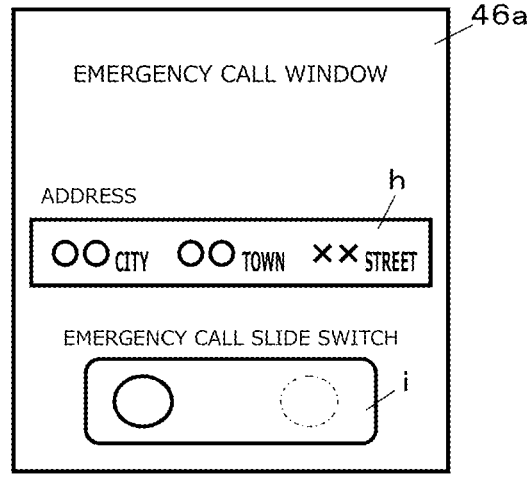
FIG. 6B is a diagram showing an emergency call window on the mobile terminal.

When the emergency call button 46 is operated by the customer, for example, an emergency call window 46a shown in FIG. 6B is displayed on the window of the mobile terminal 4. The emergency call window 46a has a spot address display h and an emergency call slide switch i. On the spot address display h, the address of the current position where the mobile terminal 4 is located is displayed, which is obtained based on the position information represented by the longitude and latitude acquired by the GPS device 43 and an address database associated with the longitude and latitude. The emergency call slide switch i is a switch for connecting the mobile terminal 4 to an emergency response agency, for example, the nearest police station.

Figure 7:
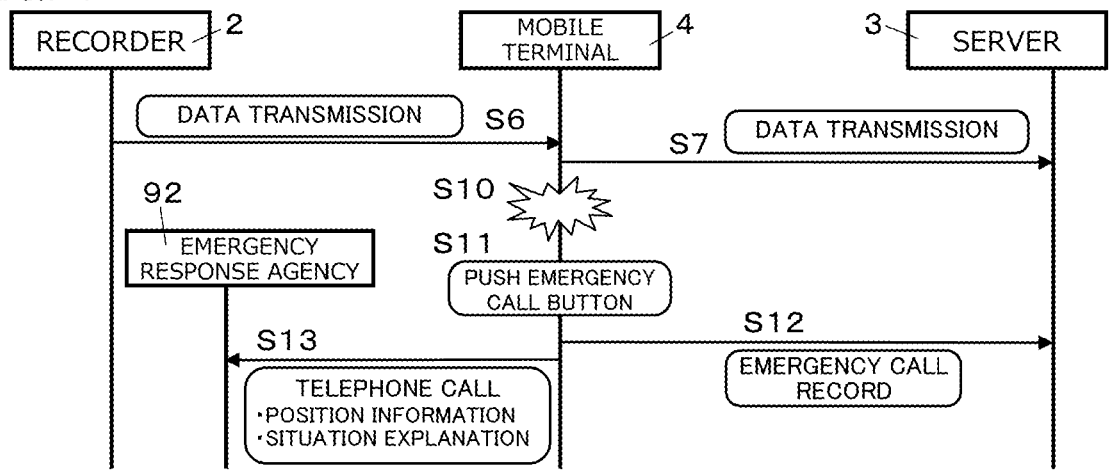
FIG. 7 is a sequence diagram illustrating an operation of an emergency call in the security system.

The processing of the emergency call is performed in the procedure shown in FIG. 7. In the space 91, while taking data from the recorder 2 to the mobile terminal 4 (S6) and transmitting and recording the recorder data to the server 3 (S7), if a trouble occurs as an emergency to the customer (S10), the customer operates the emergency call button 46 (S11).

When the emergency call button 46 is operated, the fact that the operation was performed is transmitted to the server 3 together with the position information and the time information, and they are recorded as an emergency call record (S12). Thereafter, when the emergency call slide switch i is operated, a connection of a telephone line from the mobile terminal 4 to an emergency response agency 92 is achieved, and after the connection, a telephone communication can be made between the customer and the emergency response agency 92 (S13). In the call with the emergency response agency 92, the customer can notify the location of the mobile terminal 4 displayed on the spot address display h of the emergency call window 46a by reading the location display aloud, and it is possible to properly explain the situation of the trouble. The emergency call button 46 and the emergency call slide switch i may be configured so that they can be activated in response to the voice emitted from the customer. The emergency call button 46 may also serve as the function of the emergency call slide switch i so that the telephone connection is started when the emergency call button 46 is operated.

Those functions mentioned above, namely, the function for transmitting the data acquired by the mobile terminal 4 to the server 3, the function for quickly taking and transmitting a picture in case of emergency using the emergency shoot and transmission window 45b, and the emergency call function for calling the emergency response agency 92 in case of emergency may be made usable even in a place away from the space 91.

(Viewing Button)

Next, a viewing function for viewing data recorded in the server 3 is described. As shown in FIG. 8A, the mobile terminal 4 may further include a viewing button 47 generated by installing the customer application 31 downloaded from the server 3. The processor 49 of the mobile terminal 4 is operative so that the customer can view the data in the server 3 using the mobile terminal 4, wherein the data was transmitted to the server 3 and recorded in the server 3 by the mobile terminal 4. The viewing button 47 is executed by the processor 49 by operating a program included in the customer application 31. The viewing button 47 may be displayed as an icon on the display of the mobile terminal 4. The viewing button 47 is used when the customer inspects the data, transmitted and recorded in the server 3 by the data transmission unit 45, with the mobile terminal 4.

When the viewing button 47 is operated by the customer, the recorded data viewing window 47a shown in FIG. 8B is displayed on the window of the mobile terminal 4. The recorded data viewing window 47a has a display area j for displaying the recorded image and an operation button group k for selecting one from the browsed images. The operation button group k includes, for example, a date setting button, a time setting button, a start-stop button of a moving image, a save button for saving browsed data in the mobile terminal 4, and the like.

The data viewing process is performed in the procedure shown in FIG. 9. The customer activates the viewing function by operating the icon of the viewing button 47 (S21), and makes the recorded data viewing window 47a appear. As a result, the customer application 31 makes the mobile terminal 4 access the server 3 (S22). The customer operates the operation button group k to display the recorded data in the display area j for browsing, downloads necessary recorded data to the mobile terminal 4, and saves it (S23). The recorded data saved in the mobile terminal 4 is provided to the emergency response agency 92 or the like (S24) in order to deal with the trouble after the trouble occurrence in the space 91.

The data viewing process can be executed at a place distant from the space 91, that is, at an arbitrary place away from the recorder 2. The data recorded in the recording storage 30 is protected by an identification code unique to the mobile terminal 4 used for transmitting and recording the image, and the identification code is, for example, the above-described identification code assigned to each customer application 31, the mobile terminal 4 telephone number, added password and so on. At the time of the data viewing processing, the identification code used for data protection is referred to by the server 3.

The customer application 31 may have encryption means for encrypting data to be transmitted to the server 3 and recorded. In this case, it is assumed that public key and a secret key are generated in the mobile terminal 4 when the customer application 31 is installed in the mobile terminal 4, and when data is transmitted from the mobile terminal 4 to the server 3, the data can be encrypted with the secret key and protected.

The customer application 31 may have a function for notifying the mobile terminal 4 that the recorder 2 stops operating due to some reason after the customer activates the customer application 31. With this function, the customer notices early abnormalities of the recorder 2 and can take some measures.

According to the security system 1 of the first embodiment as described above, the customer can use the recorder 2 installed in the closed-room-like space 91 as customer's own image recording device, merely by downloading and installing the customer application 31 to the mobile terminal 4 and executing the customer application 31 by the processor 49. The recorder 2 is set and installed by a person on the side managing the space 91 so that the images of the space 91 are captured and recorded, and therefore, the customer does not need to prepare such recording equipment. The customer entering the space 91 can activate the customer application 31 by customer's own intention to start the recorder 2 for capturing images or to stop the recorder 2, at will. The customer application 31 can send the image information recorded by the recorder 2 to the mobile terminal 4 and automatically transmit it to the server 3 from the mobile terminal 4 for recording.

The captured and recorded data, namely, captured by the recorder 2 and recorded in the server 3, can be protected easily as unique data of the customer possessing the mobile terminal 4, for example, using a password or encryption, because the data is recorded in the server via the mobile terminal 4 of the customer. The data recorded via the mobile terminal 4 as unique data of the customer can be identified by a predetermined identification code and can be freely browsed by the customer himself or herself using the viewing button 47 of the customer application 31, and can be saved in the mobile terminal 4.

In the event that a trouble occurs in the space 91 and the trouble has developed into an emergency situation, it is easily possible to call the police, etc. through telephone line by using the emergency call button 46 of the customer application 31 with simple slide operation or pressing operation.

The data recorded in the server 3 is captured and recorded using the recorder 2 installed in the space 91 by the one providing the service, and therefore, when a trouble occurs between the customer and the service providing side, the data can be regarded as data acquired from an objective point of view showing the situation in the space 91. Accordingly, such data can be used as evidence data to be used for solving problems of the trouble occurred in the space 91, etc., and contribute to appropriate post-problem-solving.

Second Embodiment

Figure 10:
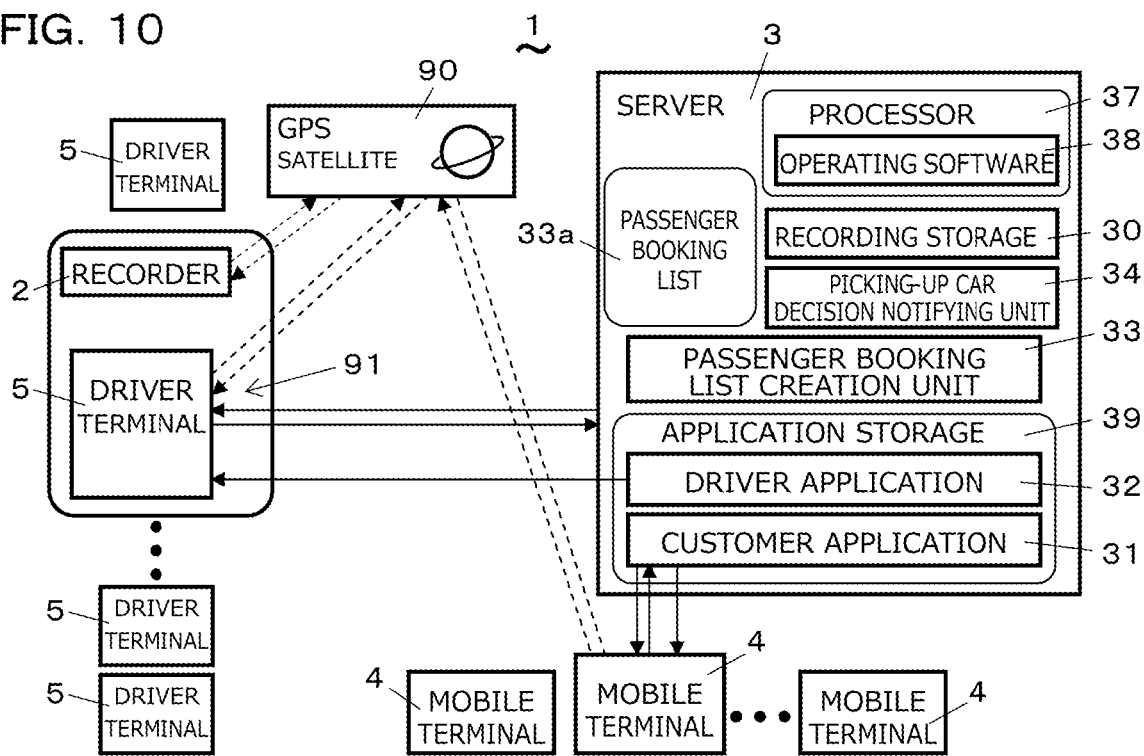
FIG. 10 is a configuration diagram of a security system according to the second embodiment of the present invention.
Figure 11A:
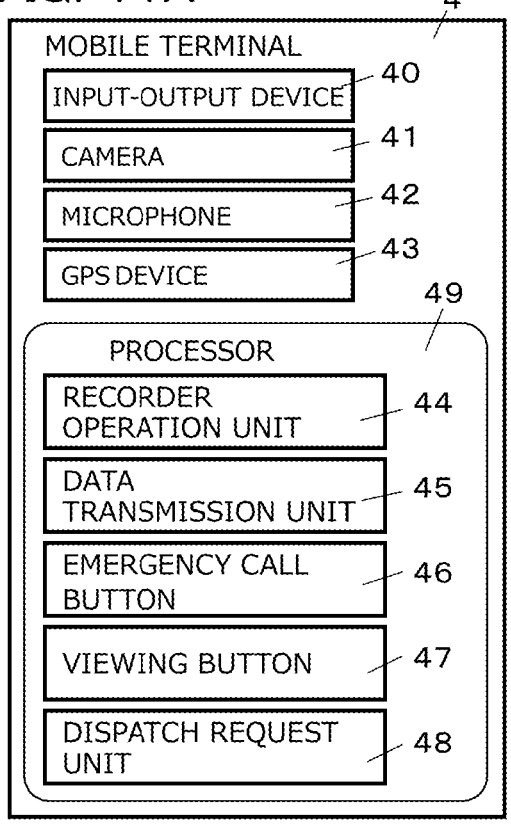
FIG. 11A is a configuration diagram of a mobile terminal used in the security system of FIG. 10.
Figure 11B:
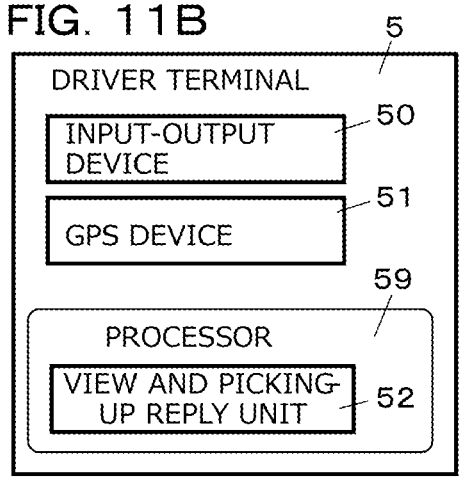
FIG. 11B is a configuration diagram of a driver terminal used in the security system.

The security system 1 according to the second embodiment is described with reference to FIG. 10 to FIG. 14. In the second embodiment, the security system 1 according to the first embodiment is applied to a taxi dispatch system. As shown in FIG. 10, FIG. 11A and FIG. 11B, the security system 1 dispatches a taxi, driven by a driving worker possessing a driver terminal 5, to the customer possessing the mobile terminal 4 by an operation of an application program included in the server 3.

The space 91 is the interior, namely, cabin of a taxi, the customer possessing the mobile terminal 4 is a customer in the taxi cabin, that is, the customer in the space 91, and the recorder 2 is mounted in the taxi driven by a diving worker of taxi. The driver terminal 5 is a terminal used by the driving worker for taxi dispatch process and can be connected to the server 3 through a network such as the Internet. Bidirectional communication is possible between the driver terminal 5 and the server 3. In the space 91, there exist the recorder 2, the driving worker of taxi and the driver terminal 5, and the customer possessing the mobile terminal 4 gets in such a space 91.

In addition to the customer application 31 and so on described in the first embodiment, the server 3 further includes a driver application 32, a passenger booking list creation unit 33, and a picking-up car decision notifying unit 34. Like the customer application 31, the driver application 32 is stored in the application storage 39.

The driver application 32 can be downloaded to the driver terminal 5 possessed by the driving worker by the driver terminal 5 accessing the server 3. The driver application 32 is installed in the driver terminal 5 and then works in association with the operating software 38.

The processor 37 of the server 3 is, by operating the passenger booking list creation unit 33, operative to receive a dispatch request and the data of the position information of the mobile terminal 4 sent from the mobile terminal 4, and to create a passenger booking list 33*a*.

The processor 37 is also, by operating the picking-up car decision notifying unit 34, operative to receive an intention of picking-up sent from the driver terminal 5, to determine whether or not the car is suitable for picking-up based on the position information of the driver terminal 5 and the position information of the mobile terminal 4, and to notify a picking-up car decision to the driver terminal 5 that is suitable for the picking-up.

The mobile terminal 4 further includes a dispatch request unit 48 in addition to configuration from the input-output device 40 to the viewing button 47 described in the first embodiment. The dispatch request unit 48 is generated in the mobile terminal 4 by installing the customer application 31 downloaded from the server 3 in the mobile terminal 4. That is, the dispatch request unit 48 is configured with a program included in the customer application 31 and executed by the processor 49. When the customer application 31 is installed in the mobile terminal 4, an icon or a menu for operating the dispatch request unit 48 is displayed on the GUI display of the mobile terminal 4.

The processor 49 of the mobile terminal 4 is, by operating the dispatch request unit 48, operative to transmit data of the dispatch request and the position information of the mobile terminal 4 from the mobile terminal 4 to the server 3. In addition, the programs of the customer application and the functions generated in the mobile terminal 4 by the customer application 31 are collectively referred to by the name of the customer application 31.

The driver terminal 5 is a terminal having functions of general portable computer such as an input-output device 50, a GPS device 51, and the like, and the driver terminal 5 may be, for example, a mobile phone, a smart phone, a tablet terminal, a PC (personal computer), or the like. The input-output device 50 performs input and output of signals between the driver terminal 5 and devices other than the driver terminal 5. The input and output between the driving worker and the driver terminal 5 are performed through the function of the input-output device 50, for example, a touch panel function of the display for the GUI. The driver terminal 5 includes a processor 59 which executes the driver application 32. The processor 59 is configured with functions included by a general mobile computer terminal.

The driver terminal 5 further includes a view and picking-up reply unit 52 which is generated by installing the driver application 32 downloaded from the server 3. The view and picking-up reply unit 52 is configured with a program included in the driver application 32 and is executed by the processor 59. When the driver application 32 is installed in the driver terminal 5, an icon or a menu for operating the view and picking-up reply unit 52 is displayed on the GUI display of the driver terminal 5.

The processor 59 of the driver terminal 5 is, by operating the view and picking-up reply unit 52, operative so that the driving worker can view the passenger booking list 33*a*, and can notify a reply of an intention of picking-up to the server 3 as a wish of the driving worker after viewing the list.

A plurality of driving workers accede to a system offered by a taxi managing company operating a taxi dispatching operation with the security system 1 and each of them receives a taxi dispatch request from a plurality of customers using the driver application 32 obtained from the server 3. The customer receives the taxi dispatch and security service using the customer application 31 obtained from the server 3.

Figure 12:
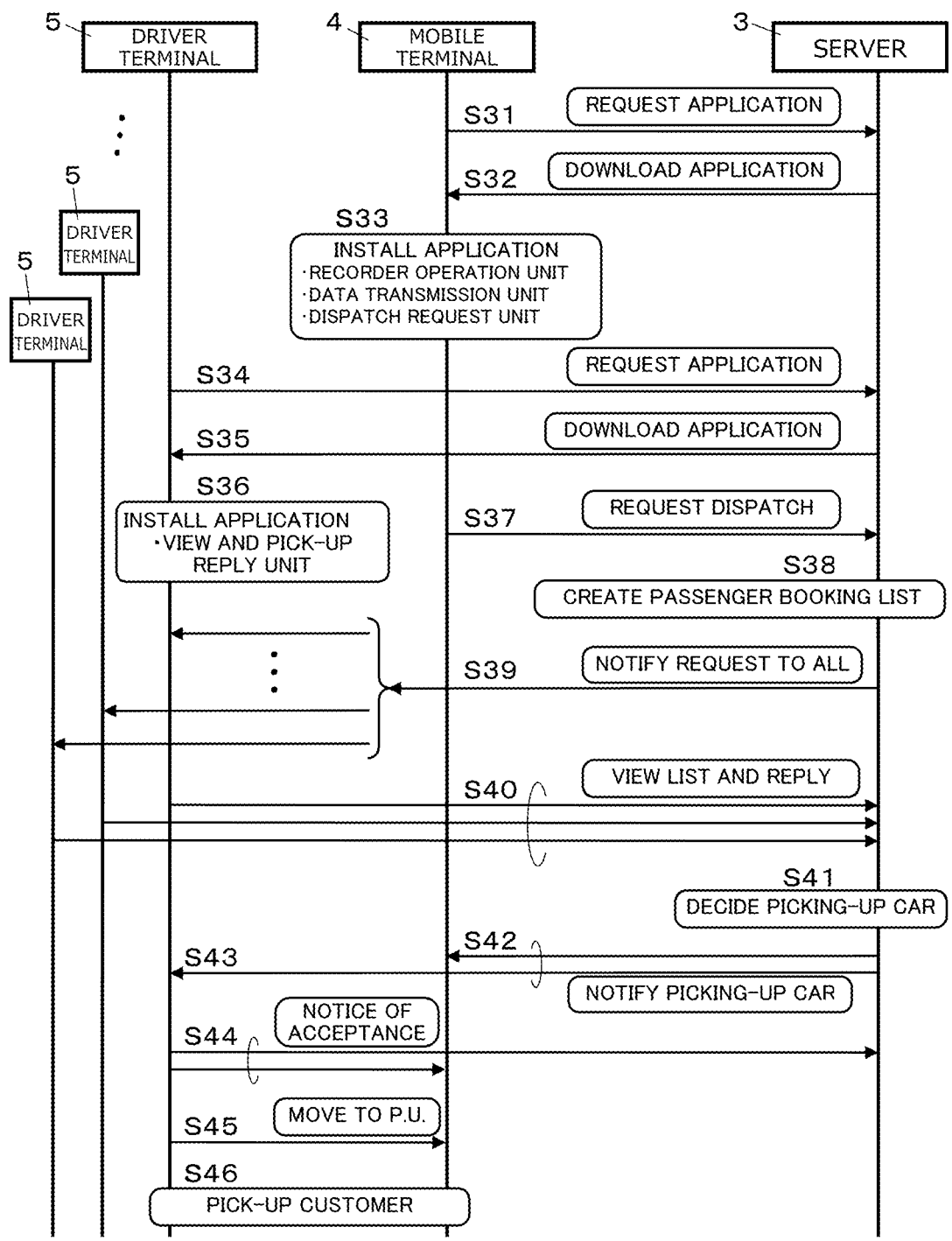
FIG. 12 is a sequence diagram illustrating an operation of the security system of FIG. 10.

Next, the processing operation for dispatching a taxi is described with reference to FIG. 12. Using the mobile terminal 4, the customer requests the server 3 to provide the customer application 31 via down load to the mobile terminal 4 (S31). When there is a request to download the customer application 31 from the mobile terminal 4, the processor 37 of the server 3 transmits the customer application 31 to the mobile terminal 4. The processor 49 of the mobile terminal 4 executes the download (S32).

When the customer application 31 is installed in the mobile terminal 4, in addition to each configuration from the recorder operation unit 44 to the viewing button 47, the dispatch request unit 48 is generated (S33). The series of processing (S31, S32, S33) until the customer installs the customer application 31 may be performed only once, before the customer receives the first service by the security system 1.

Using the driver terminal 5, the driving worker requests the server 3 to provide the driver application 32 via download (S34). When there is a request to download the driver application 32 from the driver terminal 5, the processor 37 of the server 3 transmits the driver application 32 to the driver terminal 5. The processor 59 of the driver terminal 5 executes the download (S35).

When the driver application 32 is installed in the driver terminal 5, the view and picking-up reply unit 52 is generated in the driver terminal 5 (S36). The series of processing (S34, S35, S36) until the driver worker installs the driver application 32 may be performed only once, before the driving worker receives the first dispatch request by the security system 1.

The customer transmits the dispatch request information to the server 3 by using the dispatch request unit 48 of the mobile terminal 4 (S37). Thereby, the dispatch request unit 48 transmits data of the dispatch request and the position information of the mobile terminal 4 from the mobile terminal 4 to the server 3. The information on the request for dispatch is, for example, a departure place which is a place to get on a dispatched taxi, a destination which is a getting-off place, a desired car allocation time zone, and the like. The location information of the mobile terminal 4 may be included in the information of the departure place. When the server 3 receives the dispatch request, the passenger booking list 33a, in which a new dispatch request is added, is created by the passenger booking list creation unit 33 in the server 3 (S38).

As shown in FIG. 13A, information such as taxi fare, which is calculated by the passenger booking list creation unit 33 as an estimate, is described in the passenger booking list 33a in addition to the items such as the departure place, the destination, the desired car allocation time zone, and the like for each customer. The data of the departure place of the customer is, for example, the data of the position information of the mobile terminal 4. The processor 37 of the server 3 notifies the occurrence of the dispatch request simultaneously to all the driver terminals 5 located in the area of the desired car departure location by communication means such as G mail, push email or the like (S39).

A driving worker, who has the driver terminal 5 that received this notification, can view the passenger booking list 33a by accessing the server 3 by activating the view and picking-up reply unit 52 generated by the driver application 32 downloaded to own driver terminal 5. The driving worker displays an intention-of-picking-up reply window, which is used for replying to the server 3, on the driver terminal 5 by tapping any one of the request columns in the list as the driving worker's choice.

On the intention-of-picking-up reply window, as shown in FIG. 13B, a request information of the customer selected by tapping is displayed (in this example, (3) is tapped). The driving worker inputs the picking-up time (estimated) in the window, and returns the intention of picking-up to the server 3 by tapping a reply button to pick-up customer (S40). Such a reply is individually performed from the plurality of driver terminals 5, which received simultaneously the notification of the occurrence of the dispatch request, according to a wish of each driving worker.

Thus, each of the driving workers can transmit the intention of picking-up as appropriate after viewing the passenger booking list 33a, created in the server 3, by the driver terminal 5. Therefore, each driving worker can accept a dispatch request at his or her convenient time zone without preparing in advance for receiving the dispatch request, thereby the restraint time for the driving worker can be reduced. In addition, the security system 1 can also respond relatively quickly to customer's request for pickup.

When the driving worker notifies the reply of the intention of picking-up in S40, the driver terminal 5 has acquired its own position information based on the information from the GPS satellite 90, and the pin-point position information of the driver terminal 5 at that time is transmitted to the server 3 by the view and picking-up reply unit 52 and recorded in the server 3. The position information of the driver terminal 5 and the position information of the mobile terminal 4 recorded in the server 3 are compared with each other by the picking-up car decision notifying unit 34 of the server 3 and whether or not the driver terminal 5 is suitable for the pick-up, in other words, it is judged whether or not it is in a range in which actually picking-up is possible. When a driver terminal 5 suitable for picking-up is determined among the plurality of driver terminals 5 which replied with the intension of picking-up, the decision is notified to the mobile terminal 4 (S42), and at the same time, to the driver terminal 5 determined (S43). After the notification, the processor 37 of the server 3 updates the passenger booking list 33a about the passenger to whom a picking-up car has been dispatched, for example, by deleting.

The driving worker, who is possessing the driver terminal 5 and notified of the picking-up car decision, notifies a notice of acceptance for picking-up to the server 3 and the mobile terminal 4 from the driver terminal 5 (S44). Thereafter, the driving worker notifies the start for the picking-up to the server 3 and the mobile terminal 4 from the driver terminal 5 and then moves towards the desired place for picking-up (S45), and picks up the customer (S46). The driving worker continues to continuously transmit the position information of the driver terminal 5 to the server 3 during working from the start for the picking-up to the end of the hired, for example, using the function of the driver application 32. After arriving at the destination, the driving worker notifies the server 3 that the occupied state has completed.

Next, a state where a customer gets on a taxi is described. As shown in FIG. 14, when a taxi is dispatched, a customer possessing the mobile terminal 4 gets on the taxi equipped with the recorder 2 with the driving worker possessing the driver terminal 5. The customer who got in the taxi can execute the same processing as that described in the first embodiment in the space 91 called a taxi cabin by using the recorder operation unit 44, the data transmission unit 45, the emergency call button 46, and the viewing button 47 generated in the mobile terminal 4.

The driver application 32 may include a data transmission unit for transmitting data acquired by the driver terminal 5 itself and an emergency call button for calling an emergency response agency, like the data transmission unit 45 and the emergency call button 46, respectively. In this case, the driving worker can transmit image data to the server 3 separately from the mobile terminal 4 of the customer by using the camera or the like provided for the driver terminal 5, and can call an emergency response agency.

The security system 1 may also comprise a function of card-less payment for taxi fare payment in addition to the taxi dispatching, in which case the server 3 is connected to an intermediate processing company server, and the intermediate processing company server is connected with a card company server. Further, the recorder 2 may be a device combined with a drive recorder for recording the vehicle's running speed or the like, or a drive recorder for recording images such as ahead of the vehicle at the time of driving, or the like. In this case, the customer application 31 takes the record data of the drive recorder mounted on the taxi vehicle into the mobile terminal 4, transmits it to the server 3, and records it in the server 3. Therefore, it is possible to acquire recorded data by the drive recorder mounted on the taxi vehicle as customer's own data. As a result, it is possible to increase the amount of the recorded information indicating the situation at the site.

The recorder 2 inside the taxi cabin may be one-way or two-way communicable with the server 3 via the input-output device 20, for example, it may be manipulated by remote control from the server 3 for the purpose for confirming the operation, diagnosing the fault, further adjusting the angle of view. Further, bidirectional communication may be possible between the recorder 2 and the server 3 for transmission of captured and recorded data, a control program, and the like. In addition, the recorder 2 and the driver terminal 5 may be capable of bidirectional communication with each other.

According to the security system 1 of the second embodiment, an environment that the in-vehicle affair is recorded in the server is realized, and therefore, it is expected that such an environment will produce an effect of suppressing the trouble from becoming an emergency situation, wherein the trouble relates, for example, to the traveling route, the fare, and the like, occurring between the customer and the driving worker riding together in a closed-room-like taxi cabin. In addition, the customer can ride and use the taxi for movement with a safe conscience and minimum possession, because the customer can store the captured and recorded data useful for customer's protection in the server 3 merely by possessing the mobile terminal 4 in which the customer application 31 is installed.

It is to be noted that the present invention is not limited to the above configuration and various modifications are possible. For example, the configuration of each of the embodiments described above can be combined with each other. In addition, the above-described configurations relating to the recorder operation window 44a, the data transmission window 45a, the emergency shoot and transmission window 45b, the emergency call window 46a, and the recorded data viewing window 47a are mere examples and may be appropriately set.

Third Embodiment

Figure 15:
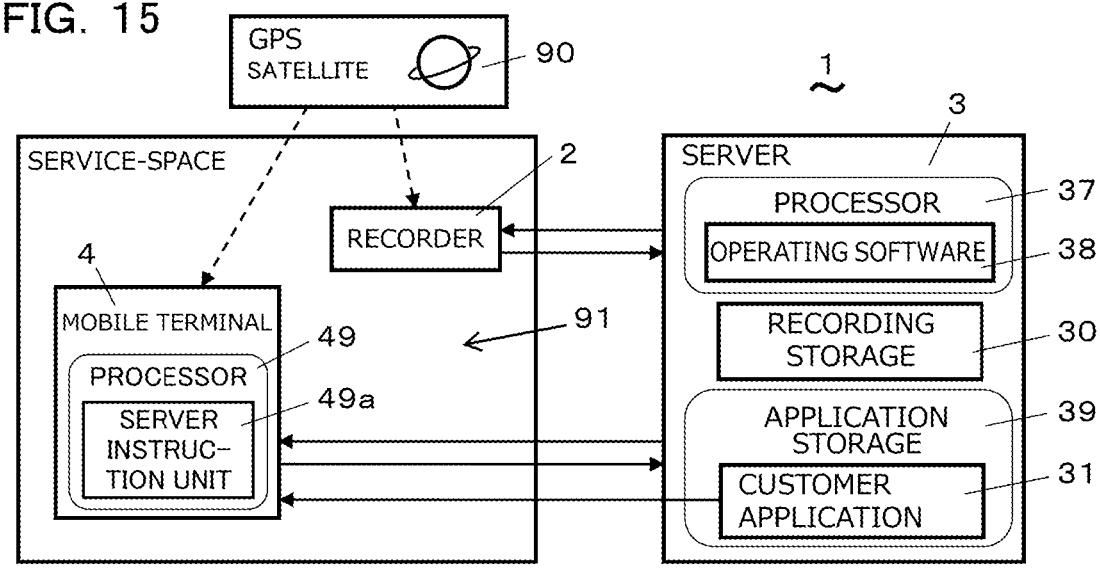
FIG. 15 is a configuration diagram of a security system according to the third embodiment of the present invention.
Figure 16:
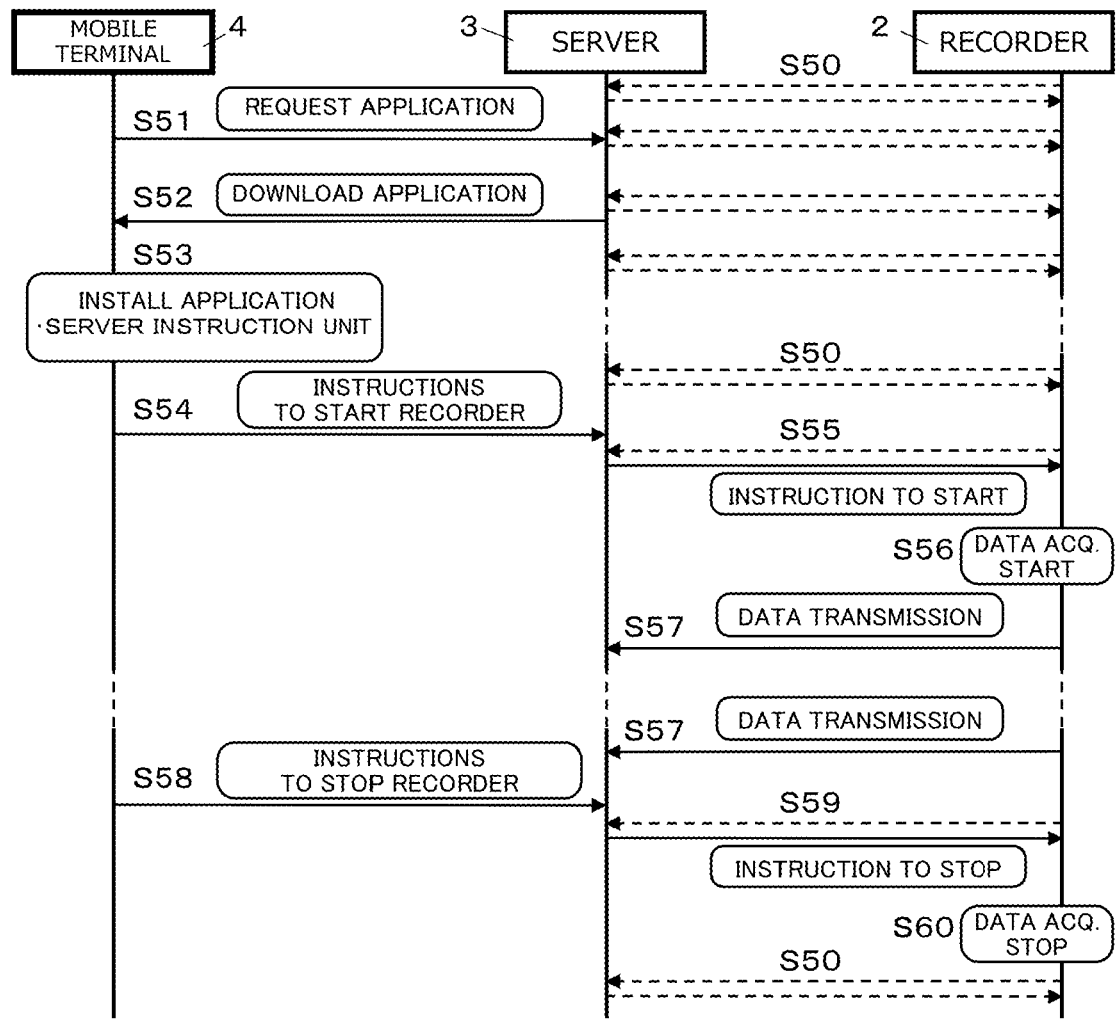
FIG. 16 is a sequence diagram illustrating the operation of the security system of FIG. 15.

The security system 1 according to the third embodiment is described with reference to FIG. 15 and FIG. 16. As shown in FIG. 15, the recorder 2 of this security system 1 has a bidirectional near field wireless communication line (such as Wi-Fi or Bluetooth (registered trademark)) with the server 3 and can perform communication. The recorder 2 has a SIM chip, for example, and performs data communication via a telephone line with the server 3. The recorder 2 communicates only with the server 3, and the server 3 communicates with both the recorder 2 and the mobile terminal 4. The mobile terminal 4 communicates with the server 3 without communicating with the recorder 2, but communicates indirectly with the recorder 2 via the server 3.

The mobile terminal 4 includes a server instruction unit 49a which is generated by installing the customer application 31 downloaded from the server 3. The server instruction unit 49a is a function operated by a program included in the customer application 31, and is executed by the processor 49. The server instruction unit 49a is used by a customer when the customer transmits operation instructions to the server 3 by using the mobile terminal 4. The server 3, upon receiving the instructions, makes the recorder 2 start its operation, takes in the data such as images and sounds acquired by the recorder 2 into the server 3 to record and accumulate the data in the server 3, and makes the recorder 2 stop its operation, via the bidirectional communication line.

Next, the operation of the security system 1 is described. As shown in FIG. 16, a customer who wishes to receive a service requests the server 3 to provide the customer application 31 via download using the mobile terminal 4 (S51). When there is a request to download the customer application 31 from the mobile terminal 4, the processor 37 of the server 3 makes the customer application 31 downloadable to the mobile terminal 4. The processor 49 of the mobile terminal 4 executes the download (S52). When the customer application 31 is installed in the mobile terminal 4, the server instruction unit 49a is generated in the mobile terminal 4 (S53). By performing this installation, icon for operating the server instruction unit 49a, for example, is displayed on the display of the mobile terminal 4.

The processor 49 of the mobile terminal 4 is operative, by executing the server instruction unit 49a, to transmit the instructions to the server 3 so that the server 3 makes the recorder 2 start the data acquisition and the server 3 takes in the data acquired by the recorder 2 into the server 3 for recording the data in the server 3. Thus, the customer instructs the server to start the data taking-in by operating the icon of the server instruction unit 49a (S54).

While the security system 1 is in operation, the recorder 2 periodically checks the presence or absence of the instructions to start the operation by communicating with the server 3 via the bidirectional communication line (S50). Upon receiving an instruction to start operation (S55), the recorder 2 starts acquisition of image and sound data (S56), and transmits the acquired data to the server 3 (S57). The recorder 2 confirms the presence or absence of instructions to stop operation at the time of data transmission. When the customer operates the icon of the server instructing unit 49a and instructs the server 3 to stop data acquisition (S58), the recorder 2 receives the stop instructions from the server 3 (S59) and stops data acquisition (S60), and again repeats the checking of the presence or absence of the instructions to start the operation (S50).

This embodiment is applied when the recorder 2, that the customer wishes to operate, is known to the server 3 or is shown to the server 3 by the customer. In the case that the third embodiment is applied to a taxi dispatch system of the second embodiment described above, the server 3 dispatches a taxi to the customer, and therefore the mobile terminal 4 held by the customer and the recorder 2 mounted on the taxi are linked in advance, the recorder 2 that the customer wishes to operate is known to the server 3.

Further, when it is necessary to transmit information for identifying the recorder 2 to the server 3, an ID code such as a number, a QR code or the like unique to the recorder 2 may be used, and for example, the information of the ID code posted on the surface of the recorder may be transmitted to the server 3 by the customer as an image taken with a camera of the mobile terminal 4. The customer may manually input the ID code to the mobile terminal 4 and transmit it to the server 3. If the recorder 2 is in an environment where short-range wireless communication such as Wi-Fi or Bluetooth can be used, the ID code may be acquired from the recorder 2 and transmitted to the server 3. The server instruction unit 49a may be provided with a function of photographing the ID code or acquiring the ID code by near field communication. As an aid for the customer to identify the recorder 2, a list of ID codes etc. of the recorder 2 belonging to the security system 1 may be included in the customer application 31 downloaded from the server 3.

According to this embodiment, by only transmitting instructions from the mobile terminal 4 to the server 3 by the server instructing unit 49a, the image and sound data in the space 91 can be transmitted from the recorder 2 to the server 3 and recorded in the server 3, and therefore the communication cost of the customer's mobile terminal 4 can be suppressed.

Modified Example of the Third Embodiment

Figure 17:
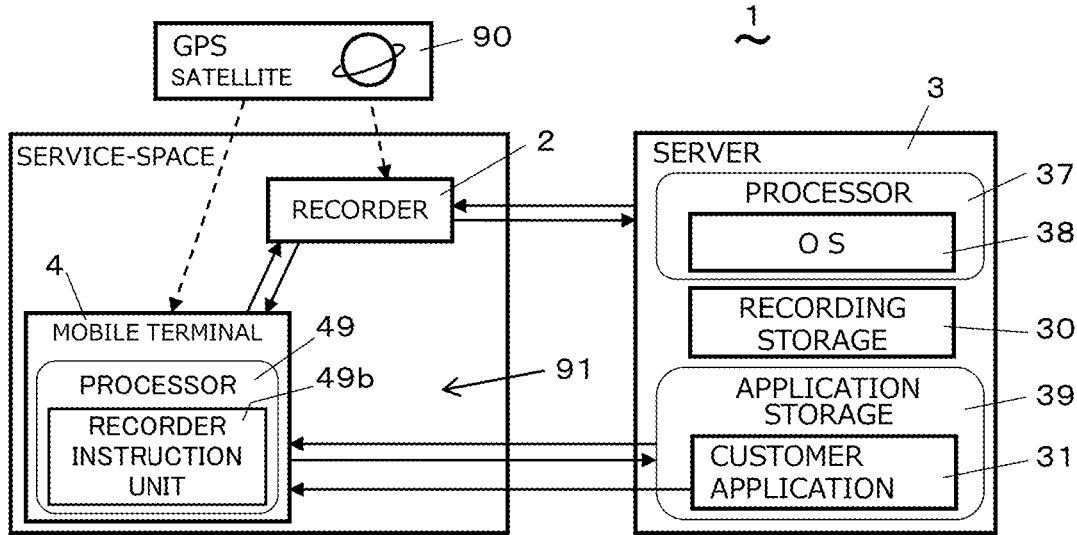
FIG. 17 is a configuration diagram of a modified example of the security system according to the third embodiment of the present invention.
Figure 18:
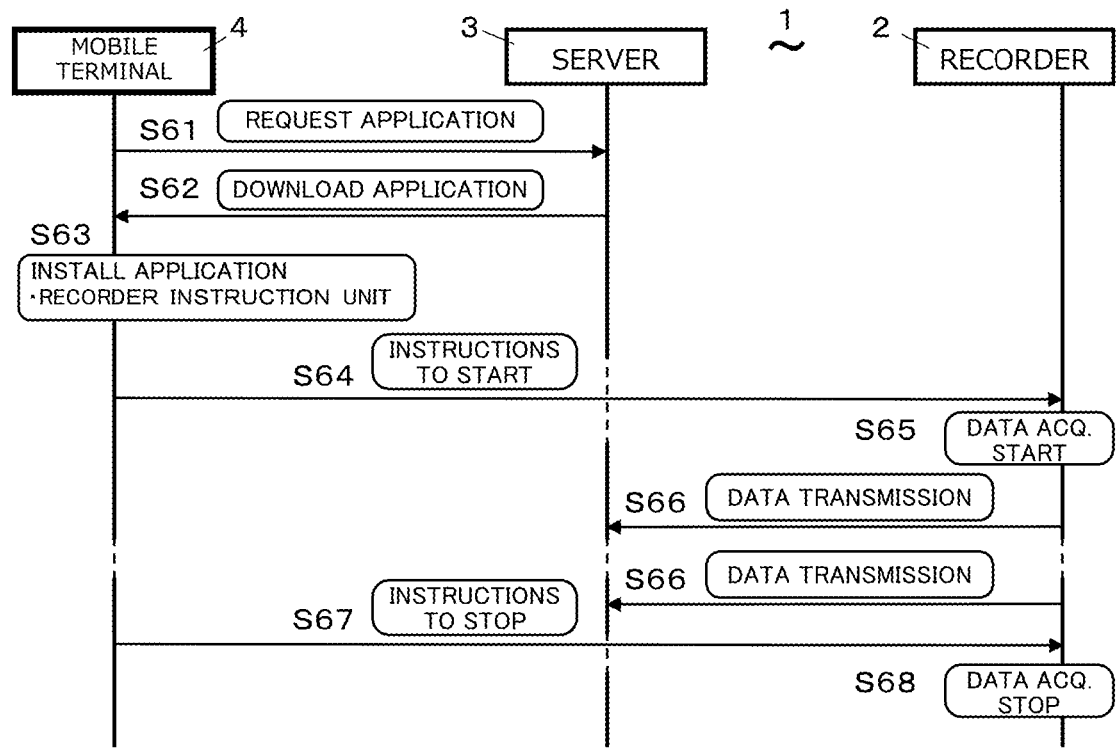
FIG. 18 is a sequence diagram illustrating the operation of the security system of FIG. 17.

The security system 1 according to a modified example of the third embodiment is described with reference to FIG. 17 and FIG. 18. As shown in FIG. 17, the security system 1 includes a recorder instruction unit 49b instead of the server instruction unit 49a in the mobile terminal 4 of the second embodiment. In addition, the recorder 2 and the mobile terminal 4 communicate with each other, for example, in a Wi-Fi environment using their respective input-output devices.

Next, the operation of the security system 1 is described. In FIG. 18, a customer who wishes to receive a service in the space 91 requests the server 3 to offer the customer application 31 by downloading using the mobile terminal 4 (S61). The processor 37 of the server 3 makes the customer application 31 downloadable to the mobile terminal 4 when the download request of the customer application 31 is received from the mobile terminal 4. The processor 49 of the mobile terminal 4 executes the download (S62). When the customer application 31 is installed in the mobile terminal 4, the recorder instruction unit 49*b* is generated in the mobile terminal 4 (S63). By performing this installation, for example, an icon for operating the recorder instructing unit 49*b* is displayed on the display of the mobile terminal 4.

The processor 49 of the mobile terminal 4 is operative to transmit instructions to the recorder 2, by executing the recorder instruction unit 49*b* so that the recorder 2 starts acquisition of data and transmits the data acquired by the recorder 2 to the server 3 for recording. The customer operates the icon of the recorder instruction unit 49*b* to instruct the recorder 2 to start data acquisition and transmit for recording (S64). The data acquired by the recorder 2 is, for example, such as image data, sound data, self position data by GPS, and the like.

Upon receiving the instructions to start operation, the recorder 2 starts acquisition of image and sound data (S65), and repeats the process of acquiring data and transmitting the acquired data to the server 3 (S66). When the customer operates the icon of the recorder instruction unit 49*b* to give an instruction to stop the data acquisition to the recorder 2 (S67), the recorder 2 stops acquiring the data in response to the stop instruction (S68).

According to this modified example, by only transmitting instructions from the mobile terminal 4 to the recorder 2 using the recorder instruction unit 49*b*, the image and sound data in the space 91 can be transmitted and recorded from the recorder 2 to the server 3, and the communication cost of the mobile terminal 4 of the customer can be suppressed.

Modified Example of the Second Embodiment

Figure 19:
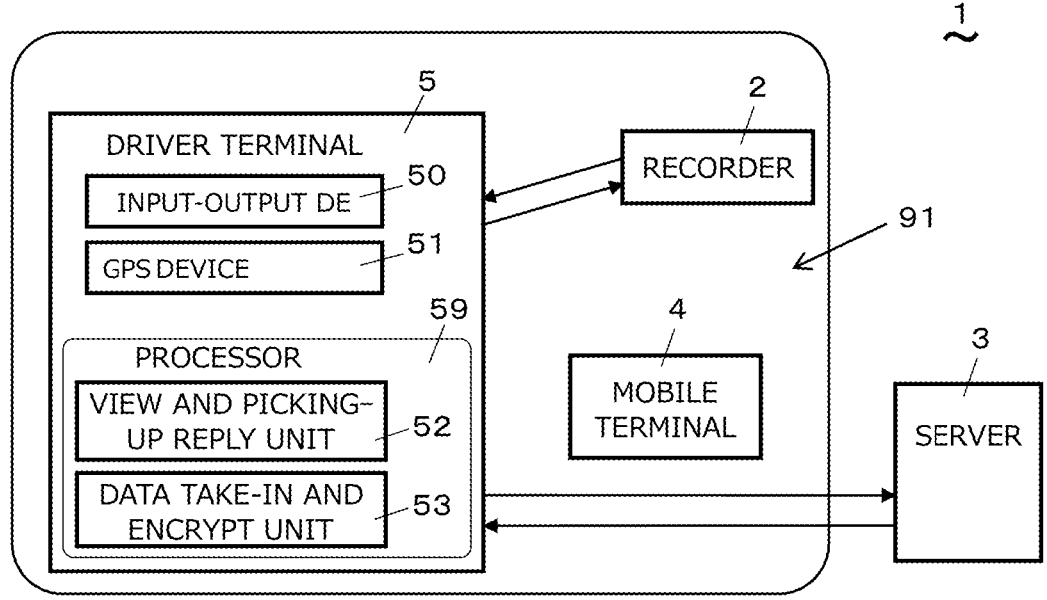
FIG. 19 is a configuration diagram of a driver terminal in a modified example of a security system according to the second embodiment of the present invention.
Figure 20:
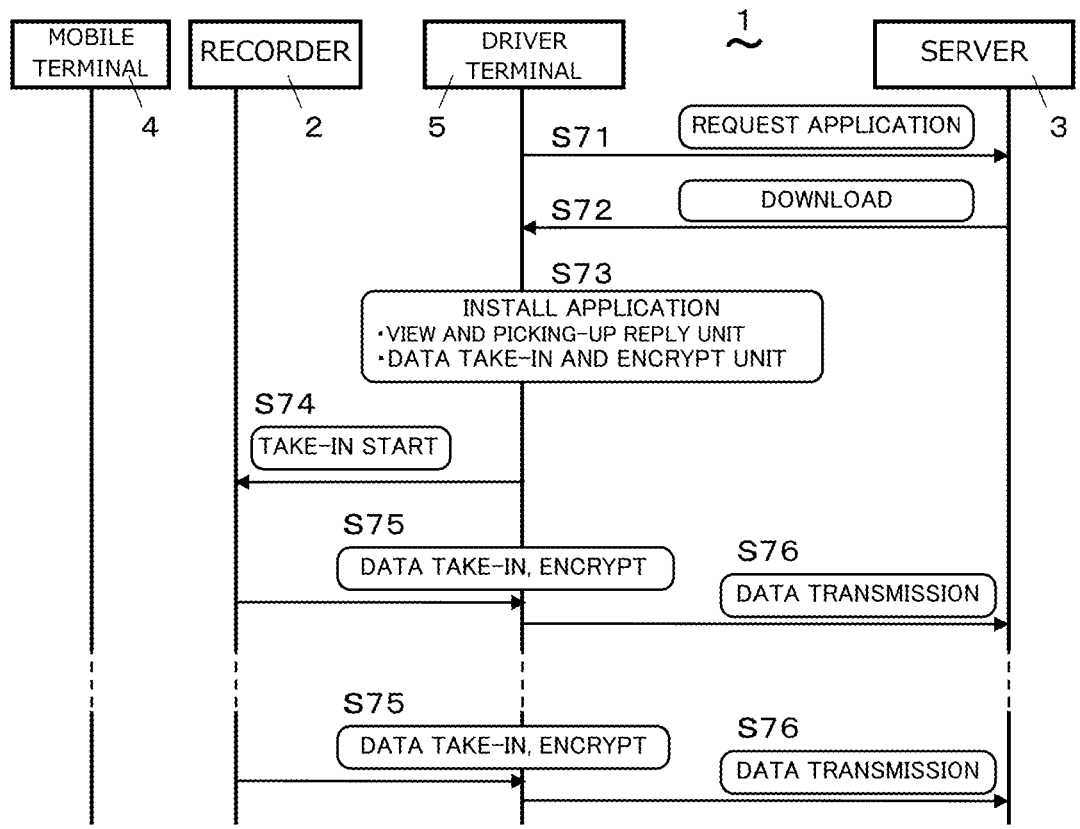
FIG. 20 is a sequence diagram illustrating the operation of the security system of FIG. 19.

The security system 1 according to the modified example of the second embodiment is described with reference to FIG. 19 and FIG. 20. This security system 1 is a system in which a function of acquiring data from the recorder 2 is added to the driver terminal 5 in the taxi dispatch system according to the above-described second embodiment. As shown in FIG. 19, the driver terminal 5 includes a data take-in and encrypt unit 53 in addition to the view and picking-up reply unit 52, which are executed by the processor 59. The data take-in and encrypt unit 53 is generated by installing the driver application 32 in the driver terminal 5. The driver application 32 can be downloaded to the driver terminal 5 in a state including a program for generating the data take-in and encrypt unit 53. However, the program may be separately downloaded as an additional option.

In the present modified example, the driver terminal 5 is capable of data communication with the recorder 2 so that data can be taken in from the recorder 2. The driver terminal 5 may use, for example, the communication environment with which the mobile terminal 4 of the customer takes in data from the recorder 2 using the data transmission unit 45, or the driver terminal 5 may use a separately provided wireless or wired communication path connected with the recorder 2.

Next, the operation of the security system 1 is described. As shown in FIG. 20, the driving worker requests the server 3 to provide the driver application 32 by downloading using the driver terminal 5 (S71). The processor 37 of the server 3 makes the driver application 32 downloadable to the driver terminal 5 when a download request for the driver application 32 is received from the driver terminal 5. The processor 59 of the driver terminal 5 executes the download (S72). By installing the driver application 32 in the driver terminal 5, the view and picking-up reply unit 52 and the data take-in and encrypt unit 53 are generated in the driver terminal 5 (S73). It is sufficient to perform the series of processes (S71, S72, S73) for installing the driver 32 only once before the driving worker first receives a dispatch request from the security system 1. Further, the data take-in and encrypt unit 53 may be generated if necessary, after generating the view and picking-up reply unit 52 only at the time of installation.

After the data take-in and encrypt unit 53 is generated in the driver terminal 5, the driving worker starts the data take-in (S74), by establishing the communication line, for example using Wi-Fi, between the recorder 2 and the driver terminal 5 and operating the data take-in and encrypt unit 53. The processer 59 of the driver terminal 5 is operative to take in the data of the image and sound acquired by the recorder 2 into the driver terminal 5 from the recorder 2 and to encrypt the data (S75). If the recorder 2 is not in operation when the data take-in and encrypt unit 53 is operated, the recorder 2 starts its operation according to the signal from the data take-in and encrypt unit 53. The data encrypted by the data take-in and encrypt unit 53 cannot be viewed with the driver terminal 5, and so, the driving worker cannot see the data taken into the driver terminal 5 from the recorder 2. The encrypted data is transmitted to the server 3 by the operation of the data take-in and encrypt unit 53 (S76). The server 3 accumulates the data transmitted from the driver terminal 5 in the recording storage 30. The data take-in from the recorder 2 and encryption (S75) and transmission to the server 3 (S76) are continued until the driving worker stops the operation of the data take-in and encrypt unit 53.

When, for example, the driving worker feels as if some sort of emergency in the car may occur, the driving worker takes in the data from the recorder 2 to the driver terminal 5 and records the data in the server 3, and the recorded data can be used later as evidence showing the situation in the space 91. For example, if troubles with taxi passengers are foreseen, the driving worker can preserve the situation evidence inside the car in a state the passenger's privacy is protected, for driver's own protection purpose. The data encrypted and transmitted to the server 3 from the driver terminal 5 is decrypted and browsable on the server 3 side, for example.

In this modified example, it is explained that data from the recorder 2 is transmitted via the driver terminal 5 to the server 3 and recorded (S76), however the security system 1 does not necessarily have to perform the processing of step S76. That is, when the data is taken from the recorder 2 and encrypted (S74), the encrypted data may be stored in the driver terminal 5 without being transmitted to the server 3. The data stored in the driver terminal 5 is transmitted or transferred to the server 3 by post-processing if necessary, so that, for example, it is decrypted on the server 3 side so that it can be browsed.

1 Security system
  2 Recorder
  22 GPS device
  3 Server
  30 Recording storage
  31 Customer application
  32 Driver application
  33 Passenger booking list creation unit
  33*a* Passenger booking list
  34 Picking-up car decision notifying unit 37 Processor of server
38 Operating software
39 Application storage
40 Input-output device
4 Mobile terminal
41 Camera (data acquisition device)
42 Microphone (data acquisition device)
43 GPS device (data acquisition device)
44 Recorder operation unit
45 Data transmission unit
46 Emergency call button
47 Viewing button
48 Dispatch request unit
49 Processor of mobile terminal
49a Server instruction unit
49b Recorder instruction unit
5 Driver terminal
50 Input-output device
52 View and picking-up reply unit
53 Data take-in and encrypt unit
59 Processor of driver terminal
91 Space

The invention claimed is:

1. A security system comprising:
a recorder for acquiring and recording data of an image or a sound for security in a cabin interior space of a taxi in which a customer receives a service provided by a service provider;
a mobile terminal possessed by the customer; and
a server used for providing the service and managed by the service provider, wherein
the server includes a processor which executes operating software for running the system, and said server further including an application storage for storing a customer application which is downloadable to the mobile terminal by accessing the server from the mobile terminal, said customer application being used by the customer to receive the service, wherein the customer application works in association with the operating software, the recorder has a function of performing bidirectional near field wireless communication with the mobile terminal,
the mobile terminal includes a processor which executes the customer application, and
the processor of the mobile terminal is operative to transmit instructions to the recorder so that the recorder starts acquiring the data, and to make the mobile terminal receive the data acquired by the recorder directly from the recorder when the mobile terminal and the recorder are ready for wireless communication as the customer with the mobile terminal enters the taxi.

2. The security system according to claim 1, wherein the processor of the mobile terminal is operative to display the image captured by the recorder sequentially in a display area of the mobile terminal when the recorder is in operation and acquiring the data.

3. The security system according to claim 2, wherein the processor of the mobile terminal is operative to transmit the data, which is taken from the recorder to the mobile terminal, to the server for recording the data in the server.

4. The security system according to claim 1, wherein the recorder is mounted on a car driven by a driving worker of taxi,
the application storage further stores a driver application which is downloadable to a driver terminal possessed by the driving worker by accessing the server from the driver terminal and said driver application being used by the driving worker to provide a taxi dispatch service to the customer, wherein the driver application works in association with the operating software, and
the driver terminal includes a processor which executes the driver application, wherein
the processor of the mobile terminal is operative, by executing the customer application, to transmit data of a dispatch request including information of a picking-up place from the mobile terminal to the server,
the processor of the server is operative:
to receive the data of the dispatch request sent from the mobile terminal, and
to create a passenger booking list,
the processor of the driver terminal is operative, by executing the driver application, so that the driving worker, using the driver terminal:
can view the passenger booking list, and
can notify a reply of an intention of picking-up to the server as a wish of the driving worker, and
the processor of the server is operative:
to receive the intention of picking-up sent from the driver terminal,
to determine whether or not the car is suitable for picking-up based on the position information of the driver terminal and the information of the picking-up place, and
to notify a decision of picking-up car to the driver terminal suitable for picking-up.

5. The security system according to claim 4, wherein the processor of the driver terminal is operative, by executing the driver application,
to encrypt the data acquired by the recorder so that it cannot be read by the driver terminal, and
to store the encrypted data in the driver terminal, or to transmit the encrypted data to the server for recording in the server.

6. A security system comprising:
a recorder for acquiring and recording data of an image or a sound for security in a cabin interior space of a taxi in which a customer receives a service provided by a service provider; and
a server used for providing the service and managed by the service provider, wherein
the server includes a processor which executes an operating software for running the system, and the server includes an application storage for storing a customer application which is downloadable to a mobile terminal possessed by the customer by accessing the server from the mobile terminal and the customer application is used by the customer to receive the service, wherein the customer application works in association with the operating software,
the recorder has a SIM chip and can communicate with the server via a wireless telephone line,
the mobile terminal includes a processor which executes the customer application,
when the server dispatches the taxi to the customer with the mobile terminal, and the customer enters the taxi and the mobile terminal and the server are linked in advance, the processor of the mobile terminal is operative to transmit instructions to the server so that the recorder starts acquiring the data and make the mobile terminal receive the data directly from the recorder, and
the recorder periodically checks the presence of the instructions to the server via the telephone line while the power is on, starts acquiring the data if the instruction is in the server and sends the acquired data to the server.

7. A security system comprising:

a recorder for acquiring and recording data of an image or a sound for security in a cabin interior space of a taxi in which a customer receives a service provided by a service provider; and a server used for providing the service and managed by the service provider, wherein the server includes a processor which executes an operating software for running the system, and the server further includes an application storage for storing a customer application which is downloadable to a mobile terminal possessed by the customer by accessing the server from the mobile terminal and the customer application is used by the customer to receive the service, wherein the customer application works in association with the operating software, the recorder has a function of performing bidirectional near field wireless communication with the mobile terminal and has a SIM chip to communicate with the server via a wireless telephone line, the mobile terminal includes a processor which executes the customer application, wherein the processor of the mobile terminal is operative to transmit instructions to the recorder so that the recorder starts acquiring the data when the mobile terminal and the recorder are ready for wireless communication as the customer with the mobile terminal enters the taxi, the recorder transmits the data acquired to the server via the wireless telephone line and makes the mobile terminal receive the data acquired directly from the recorder, when the server dispatches the taxi to the customer with the mobile terminal, and the customer enters the taxi and the mobile terminal and the server are linked in advance, the processor of the mobile terminal is operative to transmit instructions to the server so that the recorder starts acquiring the data, and the recorder periodically checks the presence of the instructions to the server via the telephone line while the power is on, starts acquiring the data if the instruction is in the server and sends the acquired data to the server or makes the mobile terminal take in the acquired data.

* * * * *